United States Patent [19]

Rantanen

[11] Patent Number: 5,466,561
[45] Date of Patent: Nov. 14, 1995

[54] IMAGE PLATE FOR DENTAL X-RAY PHOTOGRAPHY AND A METHOD OF TAKING IT OUT OF ITS SHIELD

[75] Inventor: Matti Rantanen, Kirkkonummi, Finland

[73] Assignee: Orion-Yhtyma Oy, Finland

[21] Appl. No.: 295,808

[22] PCT Filed: Mar. 1, 1993

[86] PCT No.: PCT/FI93/00072

§ 371 Date: Sep. 2, 1994

§ 102(e) Date: Sep. 2, 1994

[87] PCT Pub. No.: WO93/18435

PCT Pub. Date: Sep. 16, 1993

[30] Foreign Application Priority Data

Mar. 2, 1992 [FI] Finland .................... 920937

[51] Int. Cl.⁶ .................... A61B 6/14; G03B 42/02; G03B 42/04; G03C 3/00
[52] U.S. Cl. .................... 430/347; 430/966; 430/967; 206/455; 378/168; 378/169; 378/182
[58] Field of Search .................... 430/347, 966, 430/967; 206/455; 378/168, 169, 182

[56] References Cited

U.S. PATENT DOCUMENTS

| | | | |
|---|---|---|---|
| 3,551,673 | 12/1970 | Siegel | 378/168 |
| 3,741,386 | 6/1973 | Schmidt | 206/62 R |
| 3,958,693 | 5/1976 | Greene | 206/455 |
| 4,913,288 | 4/1990 | Tanaka | 206/455 |
| 5,077,779 | 12/1991 | Steinhausen | 378/168 |

FOREIGN PATENT DOCUMENTS

| | | | |
|---|---|---|---|
| 0249878 | 12/1987 | European Pat. Off. | G03C 3/00 |
| 0316520 | 5/1989 | European Pat. Off. | G03B 42/04 |
| 0363092A3 | 4/1990 | European Pat. Off. | G03C 3/00 |
| 0394564 | 10/1990 | European Pat. Off. | G03B 42/04 |
| 86482 | 5/1992 | Finland | G03B 42/02 |
| 62-258444 | 11/1986 | Japan | G03B 42/04 |

*Primary Examiner*—Charles L. Bowers, Jr.
*Assistant Examiner*—Mark F. Huff
*Attorney, Agent, or Firm*—Hayes, Soloway, Hennessey, Grossman & Hage

[57] ABSTRACT

The invention relates to an image plate (1) for intra-oral dental X-ray photography, the plate being placed in a shield (3) enveloping it for the duration of photography. According to the invention the shield has been made pervious to X-rays but impervious to visible light, and it comprises a closed shielding bag of plastic membrane. The shield may be made up of an inner shielding bag (3) impervious to light and a surrounding closed outer shielding bag which may be of transparent plastic membrane. After photography, the possible outer bag is first removed, the patient's saliva being removed along with it. Thereafter the image plate (1) and the surrounding shielding bag (3), one end (6) of which has been opened or, if an outer bag is used, is possibly already open, are introduced into the read-out apparatus, in which a pulling device grips the end of the plate in the bag, whereafter the bag can be pulled out while the plate remains in the read-out apparatus for the reading out of the image. The gripping is achieved, for example, by means of metal parts (2) at the ends of the plate (1) and a magnet in the pulling device.

20 Claims, 1 Drawing Sheet

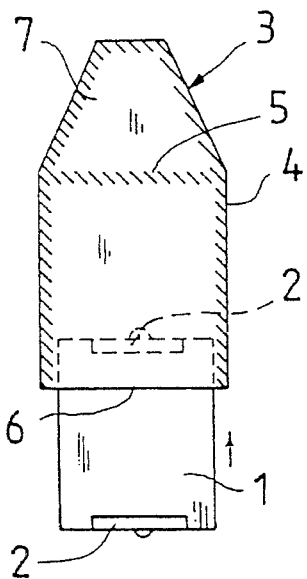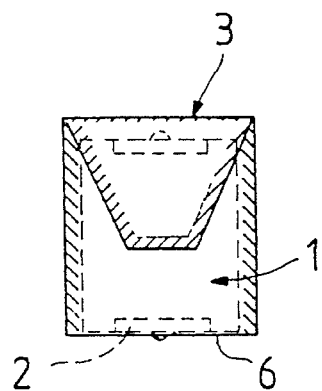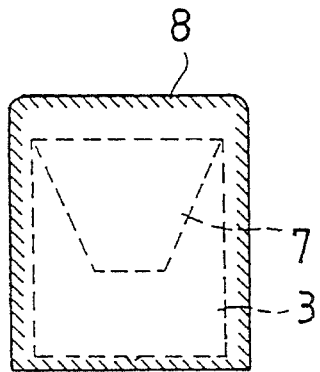
Fig.1        Fig.2        Fig.3
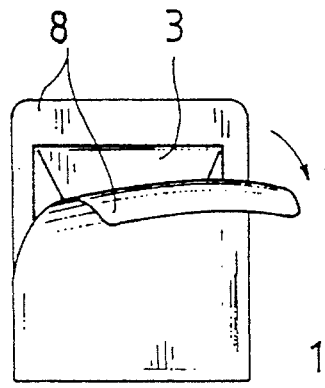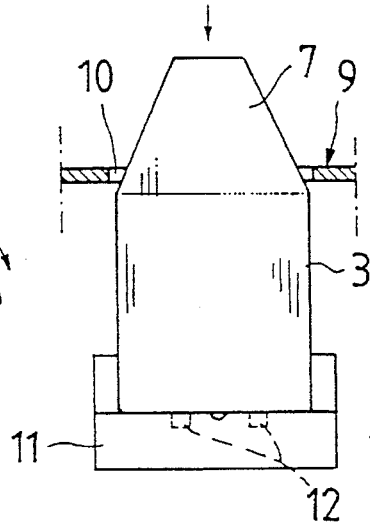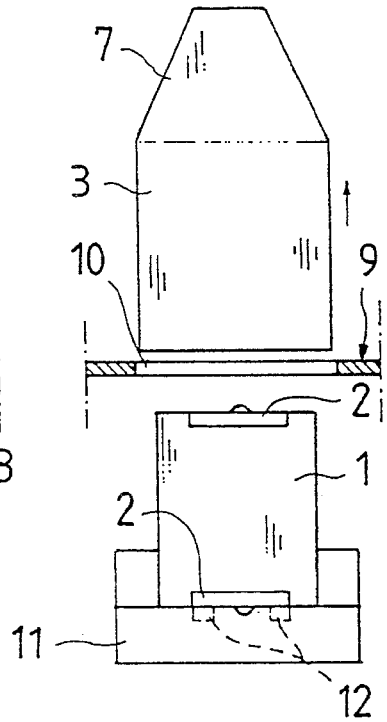
Fig.4        Fig.5        Fig.6

IMAGE PLATE FOR DENTAL X-RAY PHOTOGRAPHY AND A METHOD OF TAKING IT OUT OF ITS SHIELD

The present invention relates to an image plate for intra-oral dental X-ray photography, the plate being placed in a shield in which the plate is kept during photography and out of which the plate can be taken for the reading out of the image after photography.

FIELD OF THE INVENTION

Film which is in a foil package during photography has conventionally been used in intra-oral dental X-ray photography. Xray film is photosensitive, for which reason the opening of the package after photography and the transfer of the film to development have taken place in a darkroom.

BACKGROUND OF THE INVENTION

There is also known a cassette for intra-oral dental X-ray photography, which contains an image plate sensitive to X-rays. The functioning of the selenium-containing image plate is based on the adherence of pigment to the plate surface. The disadvantage of the system is that holding the thick and rigid cassette in the mouth is cumbersome.

The object of the present invention is to provide an image plate particularly suited for intra-oral dental photography, avoiding the above-mentioned disadvantages of prior-art systems. The invention, in which the image plate is placed in a shield in a manner known per se, is characterized in that the shield has been made pervious to X-rays but impervious to visible light, and that the shield comprises a closed shielding bag of plastic membrane.

BRIEF SUMMARY OF THE INVENTION

The image plate according to the invention, with its bag-like plastic shield, can be made substantially thinner than the prior-known cassette which contains an image plate, and consequently its use is more comfortable for the patient. As compared with intra-oral film, the advantage of the invention is that the image plate is less sensitive to external light than is film. The bag-like shield impervious to light thus constitutes a sufficient shield for the image plate between photography and the reading out of the plate, and the darkroom required by films is not needed for the handling of the plate.

DETAILED DESCRIPTION OF THE INVENTION

According to one preferred embodiment of the invention, the shield is made up of an inner bag impervious to light and a closed outer bag of plastic membrane, enveloping the inner bag. The outer bag may be of a transparent plastic material, and its sealing and opening should be maximally easy. The purpose of the outer bag is to prevent the patient's saliva from ending up in the read-out apparatus along with the inner bag and to protect the patient from any pathogens which may have ended up on the surface of the image plate. The inner bag impervious to light may be of black plastic membrane, or alternatively of black cardboard, and it may be left open at one end.

The said inner bag impervious to light is preferably at one end open and at the other end equipped with a pulling lug by which the bag can be pulled from around the image plate. The image plate end at the open end of the bag may further be equipped with a metal part which can be held by a magnet belonging to the pulling device used in the reading out of the image. The image plate can in this case be introduced with its bag into the read-out apparatus without the plate being exposed to outside light at any stage before the apparatus. The pulling off of the bag will not take place until the pulling device has gripped the end of the plate which is protected from light in the read-out apparatus.

It is also possible that the shield comprises only one bag, which is made of a plastic membrane impervious to light and is closed during photography. After photography the bag is opened at one end, whereafter the image plate can be taken out, for example by means of a magnet adhering to the metal part at the end of the plate in accordance with what has been stated above.

When each end of the image plate is equipped with a metal part, there is the further advantage that the plate can be placed in either direction in the bag open at one end. When the pulling out of the plate from the read-out apparatus and its reinsertion into the bag are carried out manually, these operations can, owing to the invention, be carried out with one movement, without loosening the hold on the plate in between.

The invention also relates to a method by which the image plate, after photography, is taken out of the shield for the reading out of the image. The essential idea of the invention is that the shield, which is pervious to X-rays but impervious to visible light and comprises a closed shielding bag made of plastic membrane, is opened, that the image plate is introduced, in a bag which constitutes part of the shield, is impervious to light and is open at one end, into a space shielded from light in the read-out apparatus, where a gripping member will grip that end of the image plate which is at the open end of the bag, and that the bag is thereafter pulled by its opposite end so that it comes off from around the image plate.

When the bag end opposite to the said open end is equipped with a pulling lug, the image plate with its bag can be introduced into the read-out apparatus so that the said pulling lug will at least in part be left outside the feed-in aperture of the apparatus, whereupon the bag will be easy to pull out of the read-out apparatus through the aperture.

BRIEF DESCRIPTION OF THE DRAWINGS

The invention is described below in greater detail with the help of the example, with reference to the accompanying drawing, in which FIG. 1 depicts the inserting of the image plate into an inner shielding bag of plastic membrane, FIG. 2 depicts the image plate in the inner shielding bag, FIG. 3 depicts the inner shielding bag enclosed in an outer shielding bag of plastic membrane, FIG. 4 depicts the removing of the outer shielding bag according FIG. 3 from around the inner shielding bag, FIG. 5 depicts the inner shielding bag and the image plate inside it, introduced into the read-out apparatus, and FIG. 6 depicts the pulling off of the inner shielding bag from around the image plate adhering to a pulling device belonging to the read-out apparatus.

FIG. 1 shows an image plate 1 for intra-oral dental X-ray photography according to the RiM technique, the plate being made up of a substantially rigid layered plastic plate approx. 1 mm thick, with stimulable phosphor on its surface. Each end of the image plate 1 is equipped with a steel part 2.

In FIG. 1 the image plate 1 is being pushed into the inner shielding bag 3, in which the plate will be during photography. The said bag 3 is made up of two opposite membranes of a plastic material which is pervious to X-rays but impervious to visible light, the membranes being sealed to each other along sealing lines 4, 5. One end 6 of the bag 3 has been left open, and a pulling lug 7 has been formed at the opposite end of the bag. The membrane material of the bag 3 may be colored black, or alternatively the membranes have been made non-transparent by means of a thin metal foil.

In FIG. 2 the image plate 1 is located inside the inner shielding bag 3, so that the steel part 2 at the end of the plate is substantially at the open end 6 of the bag. The pulling lug 7 has been folded against the rest of the bag and the image plate 1 inside the bag along the sealing line 5 running across the bag 3.

In FIG. 3 the inner shielding bag 3 according to FIG. 2, together with the image plate and the folded pulling lug 7, is closed along its edges in an outer shielding bag 8 made of heat-sealed plastic membrane. The outer bag 8, of which there is mainly required only the capability of being heat-sealed and opened, may be of any transparent or non-transparent plastic material, preferably, for example, polyamide. The outer bag 8 serves as a shield for the inner shielding bag 3 during photography and, furthermore, it can be washed before being introduced into the mouth of a patient.

When photography has been carried out, the outer bag 8 is first removed from around the inner bag 3 and the image plate inside it by tearing in accordance with FIG. 4. The patient's saliva is removed along with the bag 8 and is thus prevented from ending up in the read-out apparatus.

Next, the pulling lug 7 of the inner shielding bag 3 is straightened so as to be parallel with the rest of the bag, or the bag with the image plate inside it is introduced into the read-out apparatus 9 for image read-out by means of a laser beam in a manner known per se. FIG. 5 shows a bag 3 with the image plate, pushed through the feed-in aperture 10 into a space protected from light in the read-out apparatus, the steel part at the end of the plate in the bag adhering to the magnets 12 in the pulling device 11 provided in the space. The pulling lug 7 of the bag 3 remains, in accordance with FIG. 5, outside the feed-in aperture 10 of the read-out apparatus, in which case it can be pulled, in accordance with FIG. 6, through the aperture from around the image plate 1, while the image plate remains in the read-out apparatus.

The reading out of the image on the image plate 1 is carried out in the read-out apparatus 9 by means of a scanner and a reciprocating pulling device 11, in a manner known per se. The read-out apparatus may also erase information from the plate so that the plate is thereafter ready for a subsequent round of use. For removing the plate from the read-out apparatus, the pulling device 11 pushes the free end of the image plate 1 out through the feed-in aperture 10. Thereafter the said end of the plate may be gripped by hand, and the plate can be pulled off the magnets 12 of the pulling device 11 and be inserted, with the end detached from the magnets first, into a shielding bag 3.

For an expert in the art it is clear that the various embodiments of the invention are not limited to the above example but may vary within the accompanying patent claims. For example, it is possible to replace the steel parts 2 at the ends of the image plate by mechanical gripping parts provided in the pulling device 11, such as an opening and closing pair of jaws by which the end of the image plate is gripped.

It is also possible to use, instead of two separate shielding bags 3, 8, one shielding bag of non-transparent plastic membrane, which bag is closed tightly before being introduced, with the image plate inside it, into a patient's mouth and, after photography, is opened at one end before being introduced into the read-out apparatus.

I claim:

1. A shielded image plate for use in intra-oral dental Xray photography comprising an image plate having a substantially rigid substrate plate and a stimulable material on its surface, an inner shield bag enveloping said image plate, said inner shield bag being of a material pervious to X-rays but impervious to visible light, and a closed outer shield bag enclosing said inner shield bag, said outer shield bag being of plastic membrane.

2. A shielded image plate according to claim 1 wherein the image plate is a plastic plate with stimulable phosphor on its surface.

3. A shielded image plate according to claim 1 wherein the inner shield bag is of black plastic membrane.

4. A shielded image plate according to claim 1 wherein the inner shield bag is open from one end for enabling the image plate to be pulled out from said inner shield bag.

5. A shielded image plate according to claim 1 wherein the outer shield bag is of transparent plastic material.

6. An image plate according to claim 1, characterized in that the inner shield bag has one end which is open or capable of being opened, and is equipped at its other end with a pulling lug by which the bag can be pulled from around the image plate.

7. A method for taking an image plate according to claim 1 out of the shield for a reading out of an image, characterized in that the shield, which is pervious to X-rays but impervious to visible light and comprises a closed shield bag of plastic membrane, is opened, that the image plate is introduced, in a light-impervious bag which is open at one end and is part of the shield, into a space protected from light in a read-out apparatus, where a gripping member will attach to that image plate end which is at the open end of the bag, and that the bag is thereafter pulled by its opposite end so that it will be removed from around the image plate.

8. A method according to claim 7, characterized in that the outer shield bag of plastic membrane, being part of the shield, is first opened and removed, whereafter the inner shield bag, which is impervious to light and open at one end, and the image plate inside it are introduced into the read-out apparatus.

9. A method according to claim 8, characterized in that the removing of the inner shield bag introduced into the readout apparatus is carried out by pulling by the pulling lug at the end of the bag.

10. A method according to claim 8, characterized in that the image plate is gripped by a magnet in a pulling device belonging to the read-out apparatus, the magnet adhering to a metal part provided for that purpose at the end of the image plate.

11. A method according to claim 7, characterized in that the removing of the inner shield bag introduced into the readout apparatus is carried out by pulling by a pulling lug at the end of the bag.

12. A method according to claim 11, characterized in that the inner shield bag is introduced into the read-out apparatus in such a way that the pulling lug will remain at least in part outside the feed-in aperture, whereupon the bag can be removed from the read-out apparatus by pulling through the aperture.

13. A method according to claim 12, characterized in that the image plate is gripped by a magnet in a pulling device belonging to the read-out apparatus, the magnet adhering to a metal part provided for that purpose at the end of the image plate.

14. A method according to claim 11, characterized in that the image plate is gripped by a magnet in a pulling device belonging to the read-out apparatus, the magnet adhering to a metal part provided for that purpose at the end of the image plate.

15. A method according to claim 7, characterized in that the image plate is gripped by a magnet in a pulling device belonging to the read-out apparatus, the magnet adhering to a metal part provided for that purpose at the end of the image plate.

16. A shielded image plate for use in intra-oral dental Xray photography comprising an image plate having a substantially rigid substrate plate and a stimulable material on its surface, and a closed shield enclosing said image plate, said shield being a bag of plastic membrane which is pervious to X-rays but impervious to visible light.

17. A shielded image plate according to claim 16 wherein the image plate is a plastic plate with stimulable phosphor on its surface.

18. An image plate according to claim 16, characterized in that the shield comprising a bag impervious to light, one end of which is open or capable of being opened, is equipped at its other end with a pulling lug by which the bag can be pulled from around the image plate.

19. An image plate according to claim 18, characterized in that the image plate end which is at the open or opening end of the bag impervious to light is equipped with a metal part to which a magnet belonging to a pulling device used in a reading out of the image can adhere.

20. An image plate according to claim 19, characterized in that there is a metal part at each end of the image plate.

* * * * *

UNITED STATES PATENT AND TRADEMARK OFFICE
CERTIFICATE OF CORRECTION

PATENT NO. : 5,466,561
DATED : November 14, 1995
INVENTOR(S) : Matti Rantanen

It is certified that error appears in the above-indentified patent and that said Letters Patent is hereby corrected as shown below:

Claim 1, Col 4, line 8, "Xray" should be -- X-ray --.

Claim 12, Col 4, line 64, "the" first instance should be --a--.

Claim 16, Col 5, line 16, "Xray" should be -- X-ray--.

Signed and Sealed this

Fourteenth Day of May, 1996

Attest:

BRUCE LEHMAN

Attesting Officer

Commissioner of Patents and Trademarks